United States Patent
Templeton

[11] 3,888,072
[45] June 10, 1975

[54] ROTARY LAWN MOWER
[76] Inventor: William E. Templeton, 1807 W. Hanley Rd., Lakewood, Ohio 44904
[22] Filed: May 16, 1973
[21] Appl. No.: 360,920

Related U.S. Application Data
[63] Continuation-in-part of Ser. No. 247,664, April 26, 1972, abandoned.

[52] U.S. Cl. .................. 56/320.2; 56/295; 56/13.4
[51] Int. Cl. ..................... A01d 67/00; A01d 55/18
[58] Field of Search ....... 56/295, 320.1, 320.2, 255, 56/202, 13.4, 17.5; 209/137

[56] References Cited
UNITED STATES PATENTS

| | | | |
|---|---|---|---|
| 271,127 | 1/1883 | Robbins | 56/295 |
| 2,129,451 | 9/1938 | Talmage | 209/137 |
| 2,669,084 | 2/1954 | Warren | 56/295 |
| 2,720,070 | 10/1955 | Arrington | 56/13.4 |
| 2,734,327 | 2/1956 | Whitney | 56/295 X |
| 2,969,634 | 1/1961 | Lannert | 56/13.4 |
| 3,315,451 | 4/1967 | Hill | 56/295 |
| 3,453,812 | 7/1969 | Heidner et al. | 56/320.2 |
| 3,648,445 | 3/1972 | Efflandt | 56/320.2 |

FOREIGN PATENTS OR APPLICATIONS

| | | | |
|---|---|---|---|
| 623,835 | 2/1963 | Belgium | 56/295 |

OTHER PUBLICATIONS
Development of Quiet Blades for 18-Inch Rotary Type, Power Lawn Mowers.

Primary Examiner—Russell R. Kinsey
Attorney, Agent, or Firm—Watts, Hoffmann, Fisher & Heinke Co.

[57] ABSTRACT

A rotary lawn mower having a specially configured blade and guard housing to effect a positive shearing of grasses and to eliminate the accumulation of grass clippings within the guard housing even when the blade is rotated at speeds which are about one-third that used in present day mowers. The blade shearing edges are hook-shaped to draw grasses inwardly therealong to assure a positive shearing action. U-shaped deflectors are provided behind the shearing edges to deflect clippings forwardly of the blade. The U-shaped deflectors are cocked at such an angle as will neutralize the tendency of the clippings to travel radially inwardly and outwardly of the blade. An air inlet opening is provided on one side of the cylindrical guard housing, and a raised discharge chute of increasing cross-sectional area extends from the inlet opening to a discharge opening on the other side of the guard housing. A stream of air drawn into the guard housing through the inlet opening entrains grass clippings and carries then out through the discharge opening.

13 Claims, 10 Drawing Figures

PATENTED JUN 10 1975　　　　　3,888,072

SHEET　　2

PATENTED JUN 10 1975 3,888,072

SHEET 3

ROTARY LAWN MOWER

CROSS-REFERENCE TO RELATED APPLICATION

The present application is a continuation-in-part of co-pending application Ser. No. 247,664, filed Apr. 26, 1972, now abandoned.

BACKGROUND OF THE INVENTION

1. Field of the Invention

The present invention relates generally to rotary lawn mowers and more particularly to a rotary lawn mower having a blade and guard housing of such configuration as will effect a positive shearing of grasses and will prevent the build-up of grass deposits within guard housing.

2. Prior Art

Rotary lawn mowers are well known wherein a blade is disposed in a generally horizontal plane for rotation about a generally vertical axis. One problem with most such mowers is their tendency to accumulate wet or moist grasses beneath the guard housing that surrounds the blade. These accumulated grasses adhere to the guard housing upon drying forming a hardened deposit that closes in closer and closer about the rotating blade. Not only do such deposits often hinder the shearing action of the blade, but they also hinder the movement of grass clippings toward the discharge opening or chute.

In order to assure the proper operation of such prior art rotary lawn mowers, the operator is required to periodically clean the guard housing of these hardened grass deposits. Such periodic cleaning of the guard housing is a time consuming and messy job which is often postponed as long as possible by the operator. When it is performed, it requires that the mower be inverted or at least tilted at such an angle as may cause engine oil and air cleaner oil to flow into combustion regions of the engine where it is subsequently consumed. These periodic cleaning operations can also constitute a real danger for the operator who does not, in the interest of safety, disconnect the spark plug wire of the mower, whereupon his turning of the blade to obtain access to various portions of the guard housing can cause the mower engine to start.

Most present day rotary lawn mowers are designed to operate at a blade speed of 3600 rpm. This speed is necessary to effect a reasonably complete discharge of grass clippings and to assure a thorough shearing of grasses. It is desirable from the standpoint of safety to reduce the blade speed to about one-third of that used in present day mowers. Most known mower designs will neither effect a complete shearing action of grasses nor effect a reasonably complete discharge of clippings if reduced to one-half, much less one-third, their normal operating speed.

SUMMARY OF THE INVENTION

The present invention overcomes the foregoing and other drawbacks of the prior art and provides a rotary lawn mower with novel and improved blade and guard housing configurations which cooperate to effect a positive stearing of grasses and to entirely eliminate accumulations of grass deposits beneath the guard housing, even when the blade is rotated at about one-third the normal speed of present day mowers.

The guard housing is mounted on ground engaging wheels in the usual fashion and carries a gasoline engine or other power source. However, instead of providing corners or other dead air pockets in which grass clippings can accumulate, the guard housing is cylindrical about a generally vertical axis.

A semi-annular discharge chute of increasing cross-sectional area is provided atop the guard housing across the front of the mower. The chute has an air inlet on one side of the engine and a discharge opening on the other side of the engine.

Grass clippings are deflected upwardly into the discharge chute by means of forwardly facing U-shaped deflectors carried on the rotating blade. The deflectors are oriented to neutralize the tendency of grass clippings to travel radially inwardly or outwardly along the blade. Strong circular airflow currents established by the deflectors within the housing entrain the clippings and operate to carry them smoothly out the discharge opening.

The air inlet opening in the discharge chute has been found in tests to vastly improve the discharge performance of the mower. By virtue of the inlet opening, an airflow path of minimum resistance, and hence maximum velocity, is established through the discharge chute. The resulting powerful current of air operates to effectively entrain the clippings deflected upwardly by the blade-carried deflectors and propel them through the discharge opening.

The resulting effect of the improved blade and guard housing configurations is much more significant than merely improving the discharge of grass clippings. The grass clippings not only do not accumulate within the guard housing but are moved with such force as causes the clippings to polish the interior of the guard housing in a manner similar to the polishing action of soil on plowshares. This vastly improved discharge action enables the blade to be rotated at a much lower speed than has previously been possible and yet provides a thorough discharge of clippings.

Still another feature which permits the blade to operate effectively at vastly reduced speeds is the provision of hook-shaped shearing edges which draw grasses radially inwardly along the blade to effect a positive shearing action. This shearing action is effective even on dead and witted grasses.

Lawnmowers constructed in accordance with the present invention have been shown in tests to have the capacity to mow exceptionally wet grasses without causing the grass clippings to ball up and clog the guard housing, or to even accumulate in the guard housing.

Accordingly it is a general object of the present invention to provide a novel and improved rotary lawn mower which can operate at relatively slow blade speeds and yet provide an effective shearing action without causing grass clippings to deposit within the guard housing of the mower.

Other objects and a fuller understanding of the present invention may be had by referring to the following description and claims taken in conjunction with the accompanying drawings.

DESCRIPTION OF THE PREFERRED EMBODIMENTS

Figure 1:
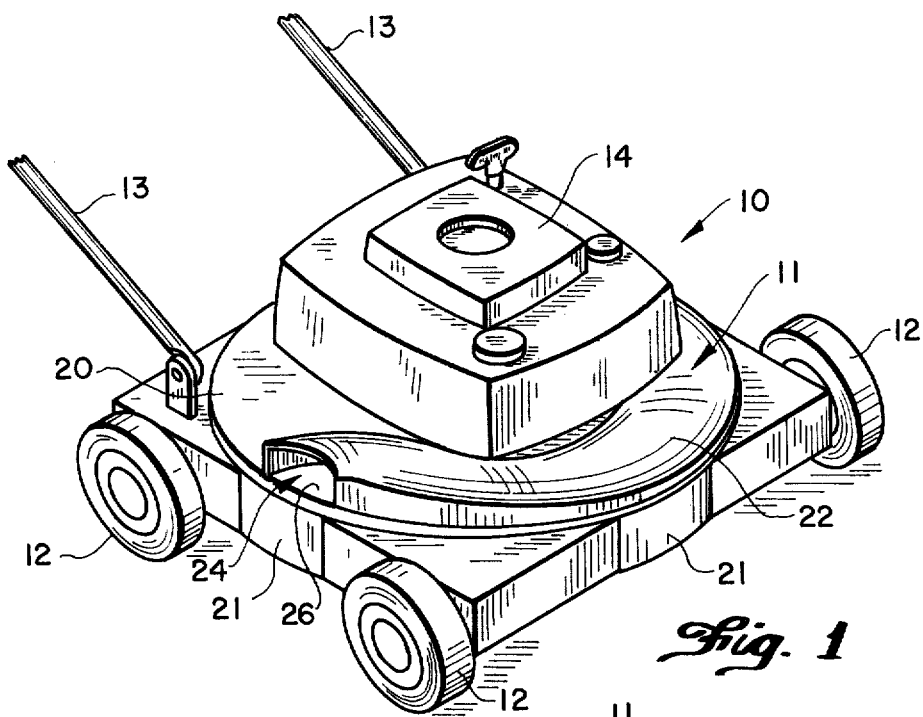
FIG. 1 is a perspective view of one lawnmower embodiment constructed in accordance with the present invention.
Figure 2:
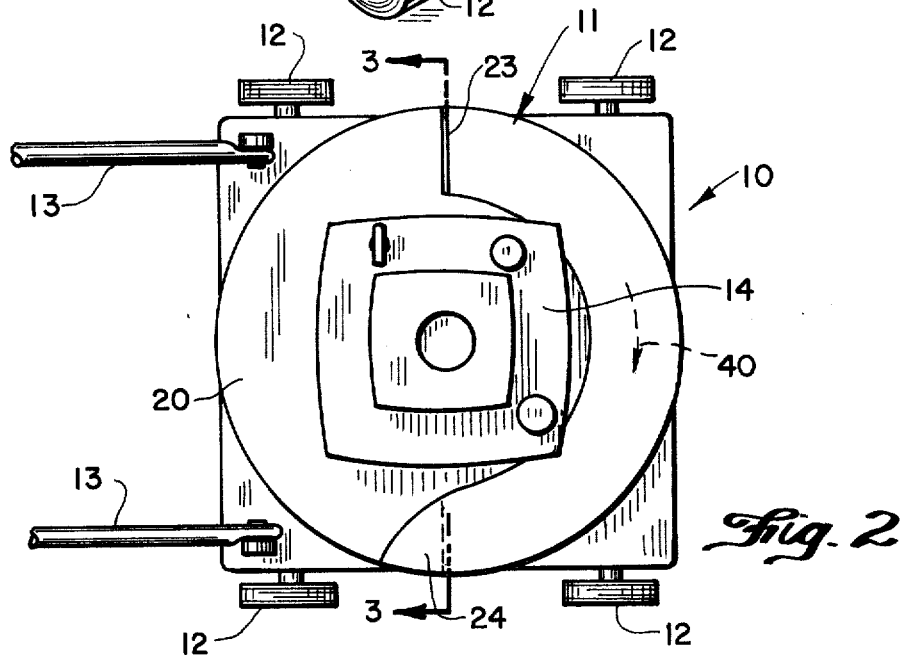
FIG. 2 is a top plan view of the lawn mower of FIG. 1.
Figure 3:
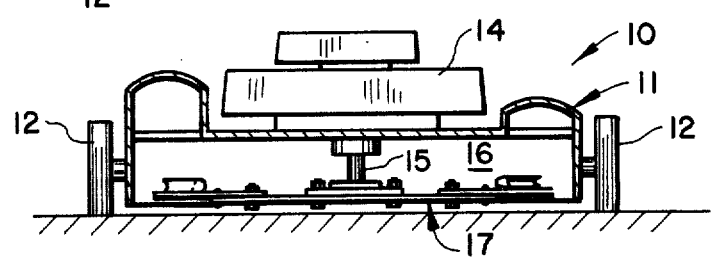
FIG. 3 is a cross-sectional view as seen from the plane indicated by the line 3—3 in FIG. 2.

Referring to FIGS. 1–3, one embodiment of a rotary lawn mower constructed in accordance with the present invention is shown generally at 10. The mower 10 includes a guard housing 11 supported on ground engaging wheels 12. A handle 13 of conventional configuration projects rearwardly and upwardly from the guard housing 11.

A gasoline engine 14 of conventional design is supported centrally on the guard housing 11. A drive shaft 15 depends along a generally vertical axis from the engine 14 into a chamber 16 defined by the guard housing 11. A blade assembly 17 is secured to the drive shaft 15 for rotation therewith in a generally horizontal plane to shear upstanding grasses.

The guard housing 11 is specially configured to facilitate the complete discharge of grass clippings. The downwardly opening chamber 16 defined by the guard housing 11 is generally cylindrical, being bounded by a planar top wall 20 and a cylindrical side wall 21. As such, the guard housing provides no corners or other dead air spaces where grass clippings will tend to accumulate.

A discharge chute 22 for grass clippings is constructed to project upwardly from the top wall 20 around the front of the mower. The chute 22 has an air inlet opening 23 at one end and a discharge opening 24 at the other end. The chute 22 increases in cross-sectional area from the inlet 23 to the outlet 24. In cross-section, the chute has an inverted U-shaped appearance whereby no corner regions are provided to permit the accumulation of grass clippings. It has been found that the clippings moving through the chute 22 will travel near the top-most portion of the chute and generally centered therein where the top wall of the chute is U-shaped as shown.

Figure 4:
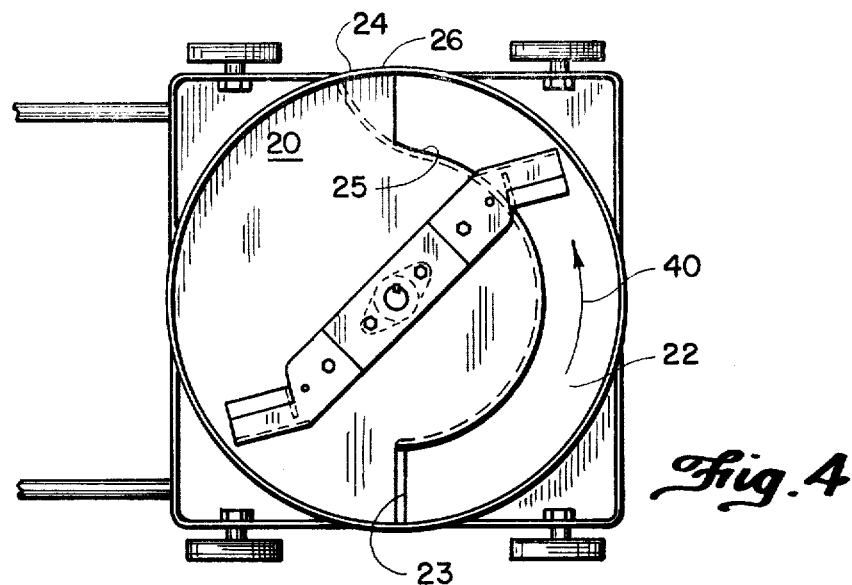
FIG. 4 is a bottom plan view of the lawnmower of FIG. 1 incorporating one blade embodiment.

Referring to FIG. 4 wherein the mower 10 is shown in bottom view, the discharge chute 22 overlies a semiannular slot 25 formed in the top wall 20. The slot 25 is of uniform radial width and extends through an arc of 180°. The chute discharge opening 24 which opens to the side of the mower extends rearwardly of the slot 25. Accordingly, the grass clippings which are discharged through the opening 24 must pass over a small generally triangular shaped section 26 of the top wall 20.

The blade assembly 17 is specially configured to propel the grass clippings upwardly over the top wall segment 26 and out the discharge opening 24. As will be explained in greater detail, each of the cutting edges of the blade assembly has a deflector positioned therebehind which serves (1) to deflect the grass blades forwardly and upwardly, and (2) to establish a strong air flow through the chute 22 to entrain the clippings and carry them out the discharge opening 24.

Figure 5:
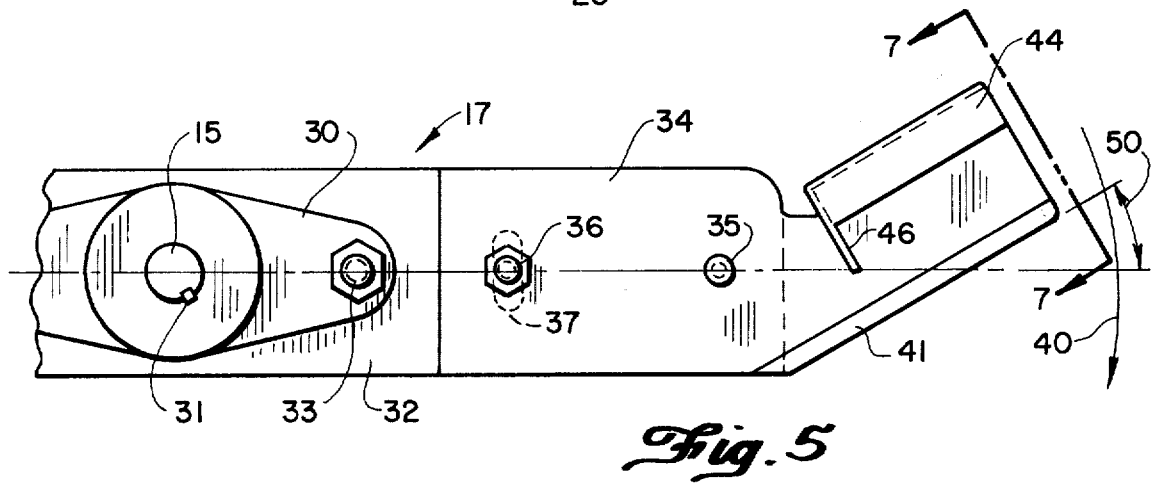
FIG. 5 is a top plan view of the mower blade shown in FIG. 4.
Figure 6:
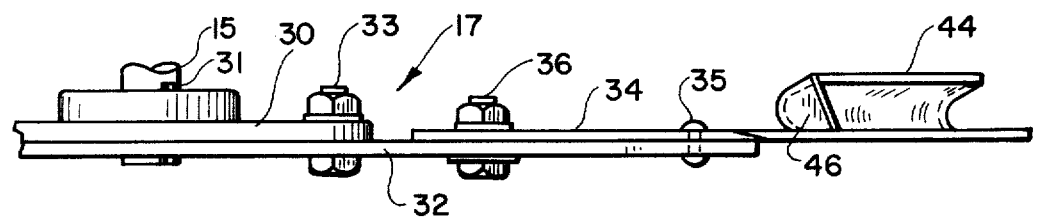
FIG. 6 is a front elevational view of the blade of FIG. 5.

Referring to FIGS. 5 and 6, the blade assembly 17 includes a central mounting hub 30 which is secured to the drive shaft 15 by means of a key 31. A supporting bar 32 is rigidly secured to the mounting hub 32 by means of threaded fasteners 33.

Opposite ends of the bar 32 mount a pair of blade members 34. Rivets 35 extend through aligned apertures in the bar 32 and the blade members 34. In order to provide a means of adjustment for the relative angle between the blade members 34 and the bar 32, the rivets are drawn only so tight as will prevent play between the bar 32 and the blade members 34. Accordingly, the rivets 35 provide pivotal connections between the bar 32 and the blade members 34.

Once the desired angle has been set between the blade members 34 and the bar 32, threaded fasteners 36 are tightened to clamp the blade members 34 rigidly in place on the bar 32. The available range of angular adjustment between the blade members 34 and the bar 32 is determined by the length of slots 37 provided in the bar 32 through which the threaded fasteners 36 extend.

The blade members 34 are rotated by the engine 14 in the direction of arrow 40. The shearing action performed by the blade members is accomplished by sharpened forward edge portions 41. Since the blade assembly 17 rotates at high speed as the mower progresses over the ground, nearly all of the upstanding grasses are engaged and sheared by the very endmost portions of the sharpened blade edges 41.

Figure 7:
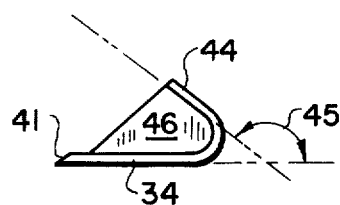
FIG. 7 is an end elevational view of the blade of FIG. 5 as seen from the plane indicated by the line 7—7 in FIG. 5.

U-shaped deflectors 44 are provided behind the outer end portions of the sharpened blade edges 41. As is best illustrated in FIG. 7, the deflectors 44 are formed by bending trailing blade edge portions through an angle indicated by the numeral 45. In the preferred embodiment the angle 45 is within the range of approximately 125°–150° so as to provide the deflectors 44 with an upwardly directed overlying lip.

The inner ends of the deflectors 44 are closed by end plates 46. These end plates 46 function to prevent such grass blades as enter the deflectors 44 from existing radially inwardly.

The U-shaped deflectors 44 and the sharpened blade edges 41 are both cocked so that the outer ends of the blade members 34 trail behind the more inwardly disposed portions of the deflectors as the blade assembly 17 rotates in the direction of the arrow 40. The angle at which the deflectors 44 and the blade edges 41 are cocked is illustrated by the numeral 50 in FIG. 5. The angle 50 is preferably within the range of 20°–50°. This angle can be adjusted through a limited range due to the pivotal mounting of the blade members 34 on the bar 32, as previously explained. Where the mower is used on heavy grasses which tend to slow the speed of rotation of the blade, the angle 50 should be set at approximately 45°. Where the mower operates on light grasses which impose a relatively small load on the engine, the angle can be reduced somewhat. The suggested setting of the angle 50 is 45° as this angle has been found to perform well with most types of grasses.

The U-shaped configuration of the blade deflectors 44 cooperates with the discharge chute 22 in several advantageous way to propel grass clippings through the discharge opening 24. First, the deflectors 44 serve to physically engage and upwardly deflect some of the grass clippings in a forward direction so as to direct them toward the opening 24. Second the deflectors 44 establish a strong circulation of air through the guard housing which serves to entrain the clippings and carry them through the chute 22 toward the opening 24. Third, it has been established in tests that the discharge capability of the mower is greatly enhanced by the provision of the air inlet opening 23 as this opening permits a high volume, high velocity flow or air through the chute 22 to effectively entrain the clippings and discharge them through the discharge opening 24.

Figure 8:
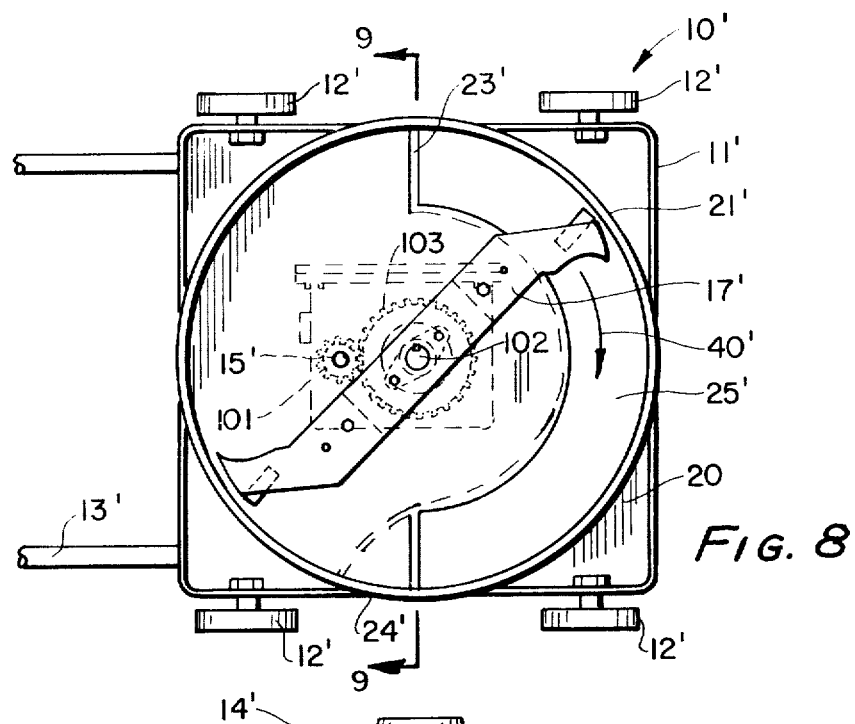
FIG. 8 is a bottom plan view of another lawnmower embodiment constructed in accordance with the present invention and including the preferred blade embodiment of the present invention.
Figure 9:
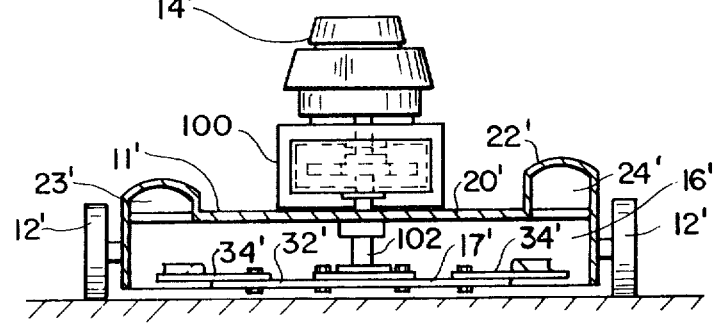
FIG. 9 is a cross-sectional view similar to FIG. 3 of the lawnmower of FIG. 8.
Figure 10:
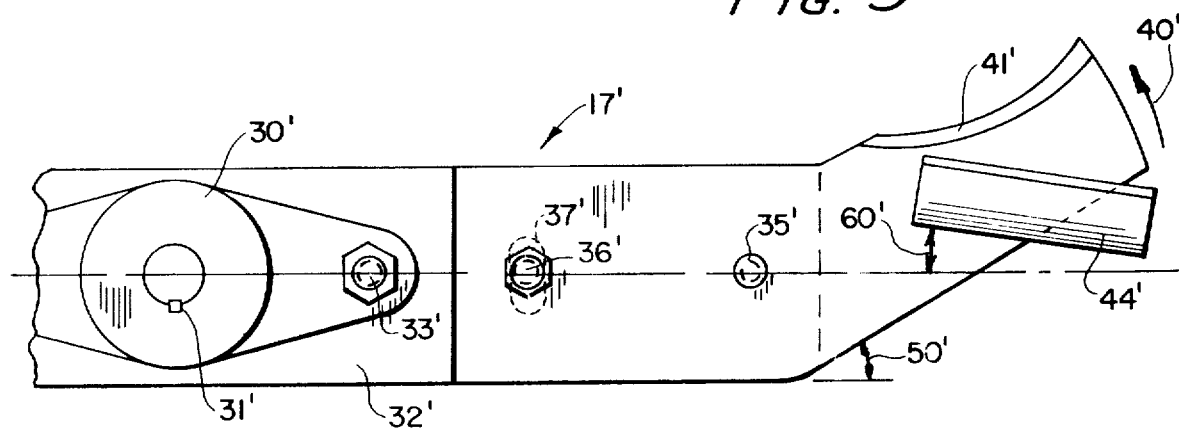
FIG. 10 is a top plan view of the mower blade embodiment of FIG. 8.

It has been found that the discharge system of the present invention is so effective, it will permit the mower to operate at a blade speed of 1,200 rpm, which is one-third the blade rotation speed of most present day lawn mowers. Referring to FIGS. 8 and 9, a second embodiment of a lawnmower constructed in accordance with the present invention is indicated generally by the numeral 10'. Since many of the features of the mower 10' are structurally equivalent if not identical in form to that of the aforedescribed mower 10, such elements are designated by the same numerals used in conjunction with the mower 10, together with a prime mark (') to distinguish the second mower embodiment 10' from the first described mower embodiment 10.

In the first mower embodiment 10, the blade assembly 17 is driven directly from the engine shaft 15 at a typical speed of about 3,600 rpm. In the second mower embodiment 10', the blade assembly 17' is driven through a 3 to 1 gear reducer which reduces the blade speed to about 1,200 rpm.

Referring to FIGS. 8 and 9, a gear reducer assembly 100 is shown interposed between the engine 14' and the top wall 20' of the guard housing 11. The motor shaft 15' depends into the gear reducer assembly 100 and mounts a twenty tooth gear 101. A stub shaft 102 is journaled by the gear reducer housing and depends into the guard housing 11. A sixty tooth gear 103 is mounted on the shaft 102 and drivingly engages the twenty tooth gear 101 to provide a three-to-one speed reduction between the input speed of the engine shaft 15' and the output speed of the stub shaft 102.

Another distinction between the embodiments 10, 10' is that the blade assemblies 17, 17' rotate in opposite drive directions. The blade assembly 17' is mounted on the stub shaft 102. Since the stub shaft 102 rotates in the opposite drive direction from that of the engine shaft 15', the blade assembly 17' rotates in a direction indicated by the arrow 40' which is opposite to the drive direction 40 of the first mower embodiment 10. The inlet opening 23', and the discharge opening 24' are likewise reversed from that of the openings 23, 24.

The blade assembly 17' differs from the first blade embodiment 17 in several respects. Whereas the first blade embodiment 17 has rearwardly cocked straight shearing edges 41, the second blade embodiment 17' has forwardly cocked hook-shaped shearing edges 41'. It has been found that the hook-shaped configuration of the shearing edges 41' serves to draw grasses radially inwardly along the blade effecting a positive shearing action even in dry and wilted grasses. The forward cocking of of the blade end region permits the hook-shaped shearing edge to be formed with a greater radius of curvature than is possible if the end region is cocked rearwardly as in the first blade embodiment 17. The preferred angle 50' at which the end regions are cocked forwardly is about 30°.

The forwardly cocked orientation of the blade end regions in the second blade embodiment 17' necessitates that the deflectors 44' be oriented differently than are the deflectors 44 in the first blade embodiment. In both blade embodiments the deflectors 44, 44' are preferably oriented to eliminate the tendency of grass clippings to travel radially inwardly or outwardly along the blade. In essence, the deflectors operate to propel clippings upwardly and forwardly of the blade. The high volume, high velocity air flow passing over the blade then entrains the clippings and carries them out the discharge opening.

In both blade embodiments, the deflectors 44, 44' are cocked such that the radially inward ends of the deflectors are forward of the radially outward deflector ends. In the second blade embodiment 17', the angle at which the deflectors are cocked is indicated by the numeral 60'. The angle 60' is preferably within the range of 5°–20°, and is selected for the particular blade speed and type of grasses being cut to neutralize the tendency of the grass clippings to flow either radially inwardly or radially outwardly along the blade.

It has been found that the angle 60' can be selected with sufficient accuracy to eliminate the need for the deflector end plates 46 described in conjunction with the first blade embodiment 17.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A rotary lawn mower comprising:
  a. a guard housing supported on ground engaging wheels and defining a downwardly opening chamber which is generally cylindrical about a vertical axis;
  b. power drive means carried by said guard housing and having a drive shaft positioned along said axis and depending into said chamber;
  c. blade means mounted on said drive shaft for rotation in a generally horizontal plane;
  d. said blade means having radially extending portions projecting outwardly from a central region and having an axis of symmetry coincident with the axis of said drive shaft;
  e. said radially extending portions each defining an end region including forward and trailing blade edge portions, said forward edge portions being sharpened to form shearing surfaces, and said trailing edge portions carrying forwardly opening generally U-shaped deflectors;
  f. said guard housing defining a peripheral discharge opening communicating with one side of said chamber and an inlet opening communicating with said chamber at a position spaced circumferentially from said discharge opening;

g. said guard housing further defining a curved channel of increasing cross section extending in the direction of rotation of said blade means from said inlet opening to said discharge opening for permitting a stream of air to be drawn into said housing through said inlet opening and channeled smoothly through said housing along said channel to entrain grass clippings in the air stream and to discharge the entrained clippings through said discharge opening.

2. The lawn mower of claim 1 wherein:
a. said guard housing comprises an inverted pan-like structure including a generally planar top wall and a circular side wall;
b. said planar top wall having a semi-annular slot formed therethrough adjacent peripheral regions thereof; and,
c. said channel being defined by a raised structure of downwardly opening U-shaped cross section overlying said semi-annular slot, said openings being formed at opposite ends of said raised structure.

3. The lawnmower of claim 1 wherein said U-shaped deflectors are each of substantially uniform U-shaped cross section along their length and are cocked at an angle whereby the radially inward ends of the deflectors are forward of the radially outward deflector ends, said angle being selected to effectively neutralize the radially inward and outward flow of grass clippings at a selected speed of blade rotation.

4. The lawnmower of claim 3 wherein said forward edge portions define forwardly facing hook-shaped shearing edges.

5. The lawnmower of claim 3 wherein said arcs subtended by said U-shaped trailing blade portions are generally within the range of 125°–150°.

6. The lawnmower of claim 1 wherein said forward edge portions define forwardly facing hook-shaped shearing edges for drawing grasses radially inwardly along the blade to effect positive shearing of the grasses.

7. In a rotary lawnmower of the type having a guard housing supported on ground engaging wheels and defining a downwardly opening chamber which is generally cylindrical about a vertical axis and has a discharge opening adjacent a peripheral region thereof, a power drive unit carried by the guard housing and having a drive shaft depending centrally into the chamber, and a blade mounted on the drive shaft for rotation therewith in a generally horizontal plane, the improvement of a system for positively propelling grass clippings out of the guard housing through the discharge opening, comprising:
a. U-shaped deflector means carried by the blade and positioned behind the cutting edge portions of the blade, said deflector means being configured to propel grass clippings in directions forwardly of the blade and to substantially neutralize the tendency of the clippings to travel radially inwardly and outwardly of the blade;
b. an air inlet opening formed in the guard housing at a location on the opposite side of the mower from the discharge opening;
c. said inlet opening being of smaller cross-sectional area than said discharge opening and being arranged to admit air to the chamber region above the blade; and
d. said guard housing defining a channel of increasing cross-sectional area in said region above the blade extending from said inlet opening to the discharge opening whereby air is drawn into the chamber region above the blade for entraining grass clippings and discharging them smoothly through the discharge opening.

8. The lawnmower of claim 7 wherein the cutting edge portions of the blade define forwardly facing hook-shaped shearing edges adapted to draw grasses radially inwardly along the blade to effect a positive shearing of the grasses.

9. The lawnmower of claim 7 wherein the blade includes a supporting member, said U-shaped deflector means are carried on said supporting member, and connection means is interposed between said supporting member and said U-shaped deflector means for adjusting the orientation of said U-shaped deflector means relative to said supporting means, whereby said deflector means can be adjusted to operate efficiently at various speeds of blade rotation.

10. In a rotary lawn mower of the type having a guard housing supported on ground engaging wheels and defining a downwardly opening chamber which is generally cylindrical about a vertical axis, a power drive unit carried by the guard housing and having a drive shaft depending centrally into the chamber, and a blade mounted on the drive shaft for rotation therewith in a generally horizontal plane and having forwardly facing U-shaped deflectors carried on the blade end regions, the improvement, comprising the combination of:
a. a discharge opening formed in the guard housing and communication peripherally with the chamber;
b. an air inlet opening formed in the guard housing at a location spaced circumferentially from said discharge opening;
c. said inlet opening being of smaller cross sectional area than said discharge opening and being arranged to admit air to the chamber region above the blade;
d. said guard housing defining a curved channel of increasing cross sectional area in a region above the blade and extending in the direction of blade rotation from said inlet opening to said discharge opening for permitting a stream of air to be drawn into the chamber region above the blade for entraining grass clippings in the air stream and for propelling the grass clippings smoothly through the chamber for discharge through said discharge opening.

11. The lawn mower of claim 10 wherein said discharge and inlet openings are located substantially on opposite sides of said guard housing.

12. The lawn mower of claim 10 wherein said guard housing has a substantially planar top surface and said channel is formed by portions of said guard housing which extend above said planar top surface.

13. The lawn mower of claim 12 wherein said inlet opening is formed at one end of said channel.

* * * * *